June 3, 1952  F. H. THOMPSON  2,599,143
BROOMCORN HARVESTER
Filed Jan. 16, 1948  8 Sheets-Sheet 2

Fig. 2.

Frank H. Thompson
INVENTOR.

June 3, 1952     F. H. THOMPSON     2,599,143
BROOMCORN HARVESTER Filed Jan. 16, 1948     8 Sheets-Sheet 3

Frank H. Thompson
INVENTOR.

June 3, 1952    F. H. THOMPSON    2,599,143
BROOMCORN HARVESTER

Filed Jan. 16, 1948    8 Sheets-Sheet 4

Frank H Thompson
INVENTOR.

BY Clarence A. O'Brien
and Harvey B. Jacobson
Attorneys

June 3, 1952  F. H. THOMPSON  2,599,143
BROOMCORN HARVESTER

Filed Jan. 16, 1948  8 Sheets-Sheet 5

Frank H. Thompson
INVENTOR.

BY *Clarence A. O'Brien*
*and Harvey B. Jacobson*
Attorneys

June 3, 1952          F. H. THOMPSON          2,599,143
BROOMCORN HARVESTER Filed Jan. 16, 1948          8 Sheets-Sheet 7

Frank H. Thompson
INVENTOR.

BY *Clarence A. O'Brien*
*and Harvey B. Jacobson*
Attorneys

June 3, 1952   F. H. THOMPSON   2,599,143
BROOMCORN HARVESTER
Filed Jan. 16, 1948   8 Sheets-Sheet 8

Frank H. Thompson
INVENTOR.

BY *Clarence A. O'Brien*
and *Harvey B. Jacobson*
Attorneys

Patented June 3, 1952

2,599,143

UNITED STATES PATENT OFFICE 2,599,143

BROOMCORN HARVESTER

Frank H. Thompson, Rolla, Kans.

Application January 16, 1948, Serial No. 2,747

12 Claims. (Cl. 56—17)

This invention relates to the broomcorn harvester and a method of handling broomcorn tops. It has for its primary object to sever the tops from standing stalks, to strip the seeds and the boots from the tops and deliver the cleaned tops in a substantially horizontal position to a suitable receiver.

Another object is to equip a conventional farm tractor having a power take-off with broomcorn harvesting units adapted to gather the tops of separate parallel rows of standing broomcorn, sever the gathered tops from the stalks of the broomcorn and deliver the tops stripped of their seeds and boots to a suitable receptacle.

A further object is to facilitate the harvesting of the broomcorn tops from stalks of different heights.

The above and other objects may be attained by employing this invention which embodies among its features means for gathering and cutting the tops from standing stalks, means for elevating the tops and stripping the seeds therefrom while they remain in an upright position, means for moving said tops while in such upright position in a rectilinear path, means for severing the bottoms from said tops while they are being so moved and means for stripping the boots from said tops while they are being moved in the rectilinear path.

Other features include means to tilt the tops after the removal of the seeds and boots therefrom and deliver them in a substantially horizontal position to a suitable receptacle.

Still other features include means for raising or lowering the gathering and cutting means to facilitate the cutting of the broomcorn stalks at the proper height to enable the best use of the tops to be made.

Referring to the drawings in detail a tractor designated generally 10 is equipped with a conventional power plant 12, traction wheels 14 and steering wheels 16. Coupled to the power plant in a conventional manner is a power take-off shaft 18 which extends rearwardly from the rear end of the tractor between the traction wheels 14, and pivotally supported as at 20 on opposite sides of the frame of the tractor 10 adjacent its forward end are hydraulic cylinders 22 equipped with pistons and piston rods 24 all in a conventional manner. These cylinders are coupled through flexible tubes 26 to conventional hydraulic control valves 28 through the medium of which hydraulic pressure is selectively admitted to the cylinders 22 for a purpose to be more fully hereinafter explained.

Pivotally supported as at 30 on the rear fenders 32 which partially encompass the traction wheels 14 are the harvesters designated generally 34.

Figure 1:
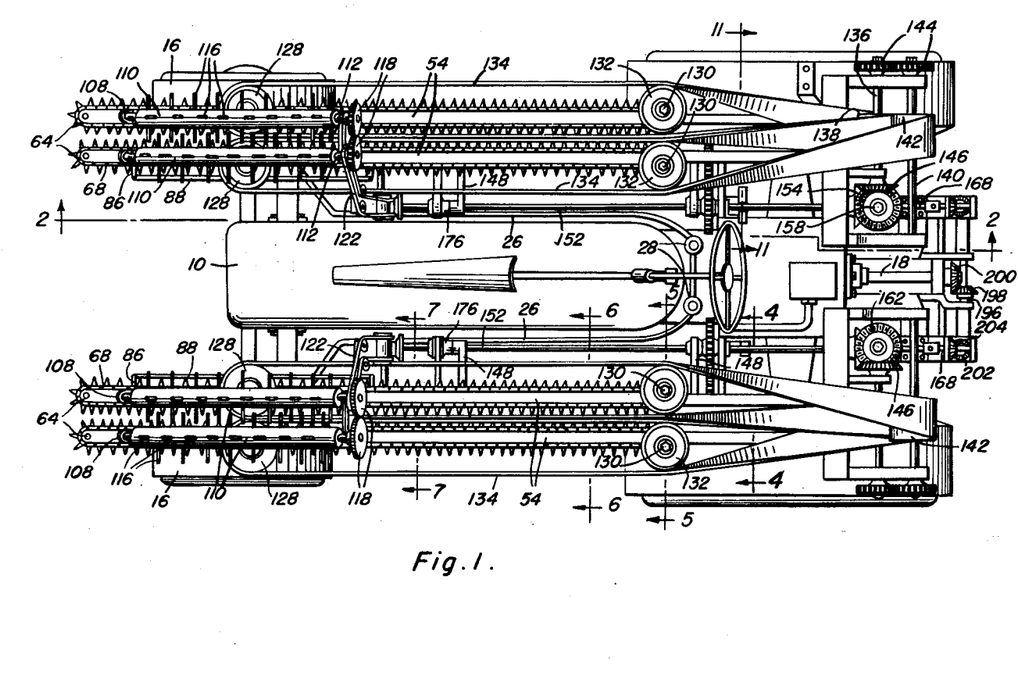
Figure 1 is a top plan view of a conventional farm tractor having a power take-off, showing the same equipped with a pair of broomcorn harvesters embodying the features of this invention.
Figure 5:
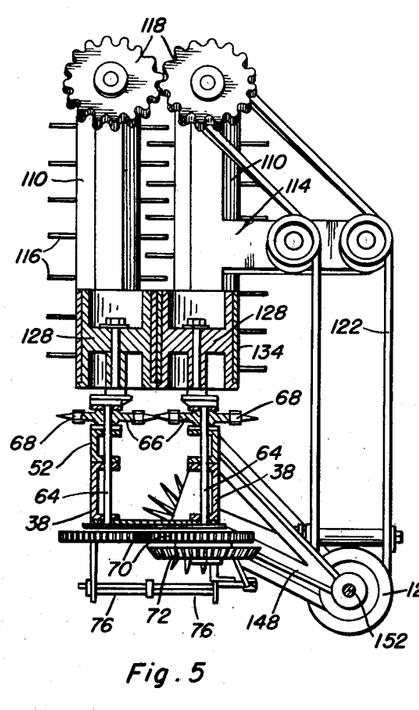
Figure 5 is a view similar to Figure 4 illustrating the gear case removed.
Figure 6:
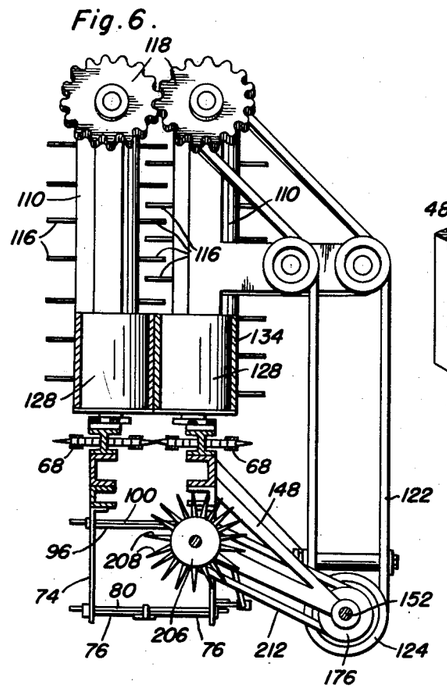
Figure 6 is a fragmentary transverse sectional view similar to Figure 4 taken substantially along the line 6—6 of Figure 1.
Figure 7:
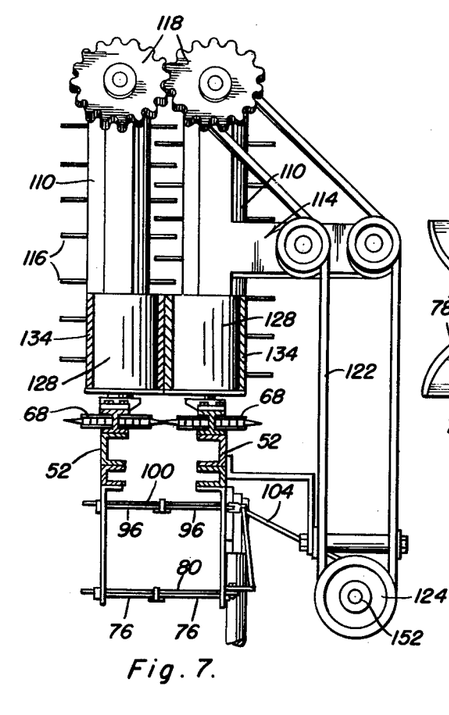
Figure 7 is a transverse sectional view similar to Figure 6 taken substantially along the line 7—7 of Figure 1.
Figure 12:
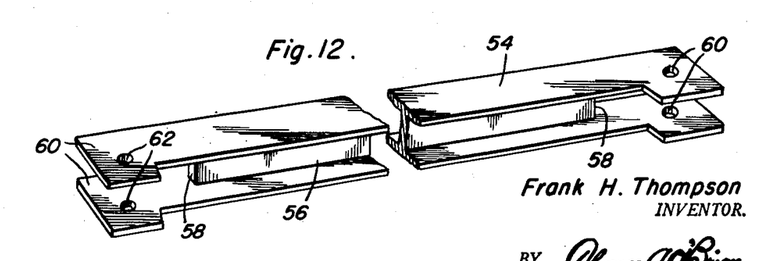
Figure 12 is an enlarged fragmentary perspective view of one of the side rails of the harvester.
Figure 16:
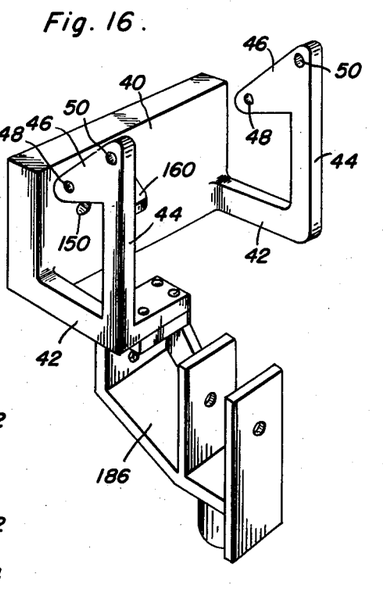
Figure 16 is an enlarged perspective view of the rear frame member of a harvester constructed in accordance with this invention.
Figure 17:
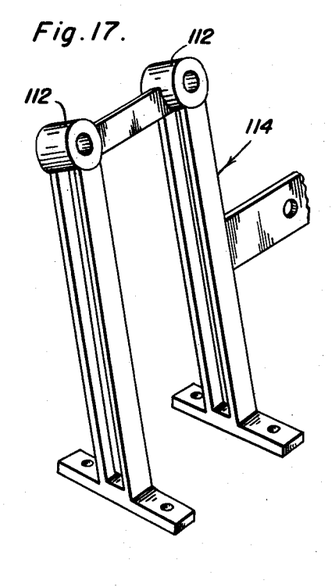
Figure 17 is an enlarged perspective view of the bracket employed to support the rear ends of the elevating rolls.

Each harvester 34 comprises a main supporting frame 36 formed of spaced parallel side bars 38, the rear ends of which are welded or otherwise rigidly secured to a cross plate 40 (Fig. 16) which extends downwardly below the level of the side bars 38 and is provided at its lower edge on opposite sides with rearwardly extending arms 42, the rear ends of which terminate in upwardly extending brackets 44 carrying at their upper ends substantially triangular shaped heads 46 which are pierced with transversely extending openings 48 and 50 for a purpose to be more fully hereinafter explained. Supported on the side bars 38 adjacent their forward ends are forwardly projecting spaced parallel arms 52 which project in substantially parallel relation to the longitudinal axis of the tractor 10 to a point in advance of the forward end thereof, and supported on the upper edges of the arms 52, and coextensive therewith are guide rails 54. These guide rails 54 comprise an I-section having a vertical web 56 (Fig. 12), opposite ends of which are cut away as at 58 to form spaced parallel longitudinally extending arms 60 which are pierced with aligning openings 62 through which extend the axle shafts 64 of sprockets 66 over which gathering chains 68 operate as will be readily understood upon reference to Figure 1. The sprockets 66 at the forward ends of the guide bars 54 are idler sprockets, while the sprockets at the rear ends of the guide bars are keyed or otherwise fixed to their shafts 64 (Fig. 5) which project downwardly below the lower edges of the side bars 38 and are equipped with meshing spur gears 70 by which the sprockets 66 and the chains 68 are driven. A suitable bevelled drive pinion 72 is coupled to one of the sprockets 70 and has driving connection with the power take-off shaft 18 as will be more fully hereinafter explained.

Figure 8:
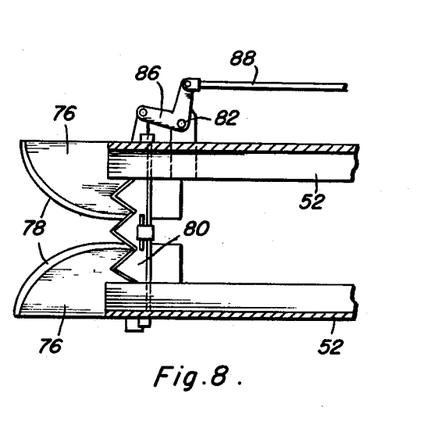
Figure 8 is an enlarged fragmentary sectional view taken substantially along the line 8—8 of Figure 2.
Figure 9:
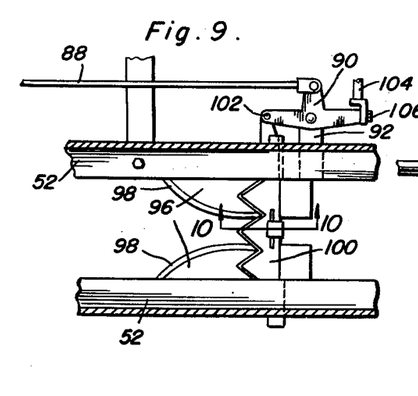
Figure 9 is an enlarged fragmentary sectional view taken substantially along the line 9—9 of Figure 2.
Figure 10:
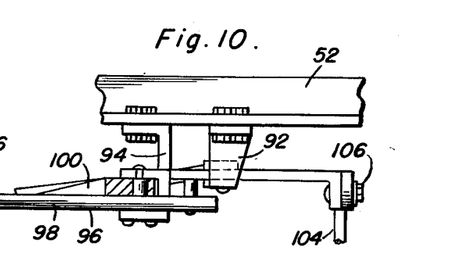
Figure 10 is an enlarged sectional view taken substantially along the line 10—10 of Figure 9.
Figure 11:
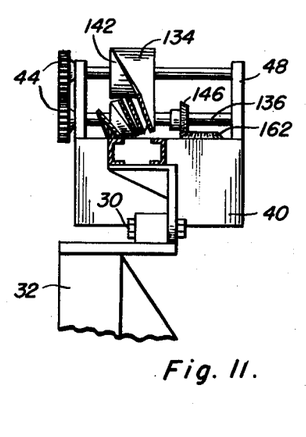
Figure 11 is an enlarged fragmentary transverse sectional view taken substantially along the line 11—11 of Figure 1.

Depending from the underside of the arms 52 adjacent their forward ends are supporting brackets 74 (Fig. 2) on the lower ends of which are supported spaced blades 76 (Fig. 8) the cutting edges 78 of which are in opposed relation and curve outwardly to form guides between which the stalks of the standing broomcorn are directed as the tops thereof enter between the chains 68. A sickle blade 80 is mounted to slide transversely across the upper sides of the blades 76, and pivotally supported as at 82 to a depending bracket 84 for movement in a horizontal arc is a bell crank 86, one end of which is coupled to the sickle bar 80 while the opposite end is connected to one end of a link 88 which extends rearwardly alongside of its respective harvester 34 and has its rear end pivotally coupled to one arm of a rocking lever 90 (Fig. 9). This arm 90 is mounted to rock in a horizontal arc on a bracket 92 which depends from the underside of the outermost arm 52 of the frame 36, and fixed on suitable brackets 94 (Fig. 10) which depend from the arms 52 intermediate their ends are blades 96, the cutting edges 98 of which curve forwardly and outwardly and serve as guides for the bottom ends of the cut tops of the broomcorn. A sickle blade 100 is mounted to slide transversely across the upper sides of the blades 96 and is coupled as at 102 to the arm 90 so that when the arm 90 is rocked about its pivot in a horizontal arc, the sickle blade 100 will be moved transversely of the blades 96. Obviously rocking movement of the arm 90 will also cause the sickle blade 80 to slide transversely of the blade 76 through the medium of the link 88, and hence both sickle blades 80 and 100 will be driven in unison. A suitable connecting rod 104 is pivoted as at 106 to one end of the rock arm 90, and the opposite end of the connecting rod 104 is coupled to the drive mechanism to be more fully hereinafter described, in such a manner as to cause the arm to rock when the drive mechanism is set in motion.

Figure 13:
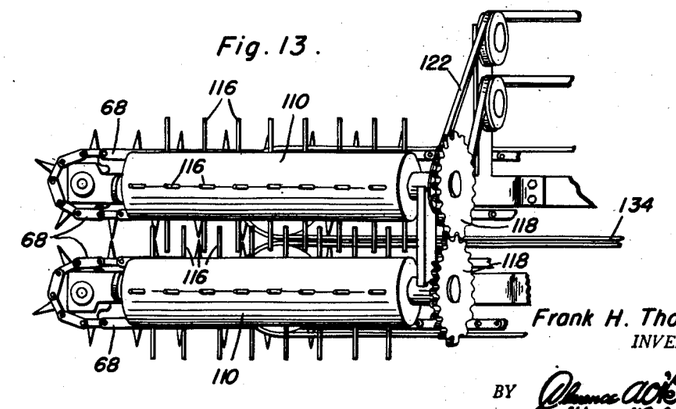
Figure 13 is a fragmentary plan view of the forward end of the gathering means.
Figure 14:
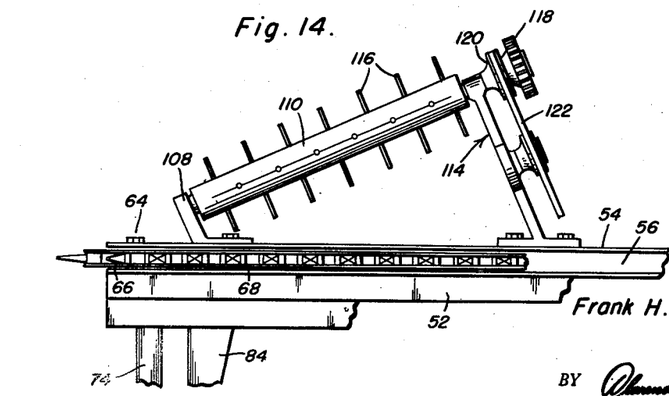
Figure 14 is a side view of the device illustrated in Figure 13, this view being taken upon a somewhat smaller scale than Figure 13.
Figure 15:
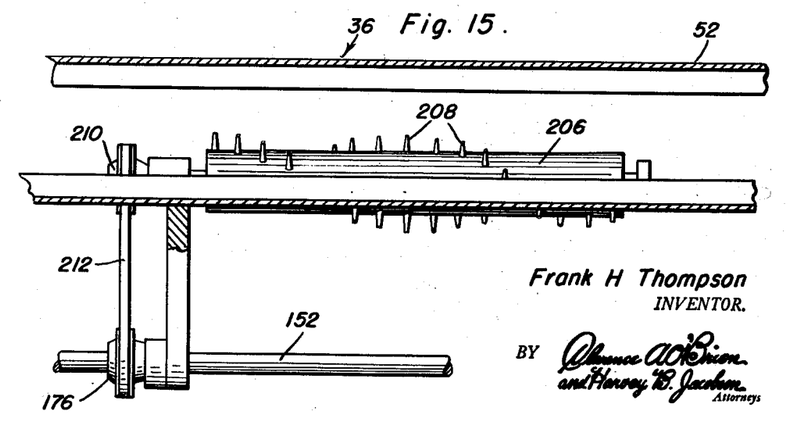
Figure 15 is a fragmentary enlarged horizontal sectional view taken substantially along the line 15—15 of Figure 2.

Mounted in suitable brackets 108 (Fig. 2) which project upwardly from the guide bars 54 adjacent their forward ends, are the forward ends of upwardly and rearwardly inclined elevating rolls 110. The rear ends of these rolls are journalled in suitable bearings 112 carried at the upper ends of an upwardly and forwardly inclined frame designated generally 114. As illustrated in the drawings the elevating rolls 110 lie along spaced parallel axes which lie substantially in spaced parallel vertical planes which intersect the axes of the shafts 64, and these rolls 110 are provided with radial fingers 116 which as illustrated in Figure 13 cooperate in stripping the seeds from the cut top of a stalk of broomcorn while the rolls 110 elevate it, as it moves rearwardly of the machine between the chains 68. The upper rear ends of the axle shafts upon which the rolls 110 are mounted have secured thereto meshing spur gears 118 by means of which the rolls 110 are driven in unison. A suitable drive pulley 120 has driving connection with one of the spur gears 118 and is adapted to be driven through the medium of an endless belt 122 which has driving connection with a drive pulley 124 driven by the power take-off shaft 118 as will be more fully hereinafter explained.

Extending transversely across the arms 52 near the brackets 94 is a U-shaped cross member 126 (Fig. 2) to which is pivoted as at 127 the upper end of the piston rod 24 on its respective side of the tractor 10 on which the particular harvester 34 is mounted. The cylinders 22, the pistons therein and the piston rods 24, together with the brackets 126 serve as supports for the forward ends of the respective harvesters and by manipulating a valve 28 the height of the forward end of the harvester on its respective side of the tractor may be varied to suit different conditions.

Mounted for rotation about vertically extending axes substantially midway between the forward and rear ends of the rollers 110 are spaced parallel idler pulleys 128, the peripheries of which run in closely spaced relation on opposite sides of the longitudinal axis of each frame 36. Mounted adjacent the rear ends of the guide rails 56 for rotation about spaced parallel vertical axes are spindles 130 about which closely spaced idler pulleys 132 rotate. Like the pulleys 128 the peripheries of the pulleys 132 are closely spaced and located symmetrically upon opposite sides of the longitudinal axis of their respective frames 36 and trained over the pulleys 128 and 132 on each harvester unit 34 is an endless belt 134, the major portions of the runs of which lie vertically with the adjacent runs of the belt lying substantially against one another to form travelling gripping surfaces between which the cut tops of the broomcorn are moved toward the rear end of the tractor. Mounted for rotation about a horizontal axis adjacent the rear end of each frame in the aligning openings 48 (Fig. 16) is a drive shaft 136 supporting intermediate its ends a drive pulley 138 around which the innermost runs of the respective belt 134 are trained. A similar drive shaft 140 is mounted for rotation about a horizontal axis in the openings 50 (Fig. 16) and supported intermediate the ends of the drive shaft 140 is a drive pulley 142 over which the outer runs of the belt 134 are trained. Keyed or otherwise fixed to one end of each drive shaft 136 and 140 is a spur gear 144, and these gears have meshing engagement so that the drive shafts 136 and 140 will rotate in unison in opposite directions. By thus twisting the inner runs of each belt 134 toward the horizontal at the rear end of the harvester and separating these runs by passing them around the respective drive roller 138, as illustrated in Figure 2, it is evident that the broomcorn tops upon leaving the vertical runs of the belts 134 will be given a tilt toward the horizontal and released from the gripping action of the adjacent runs of the belts.

Fixed adjacent the end of the drive shaft 136 remote from that carrying the spur gear 144 is a bevelled drive pinion 146 which is driven from the power take-off shaft 18 in a manner to be more fully hereinafter described.

Figure 4:
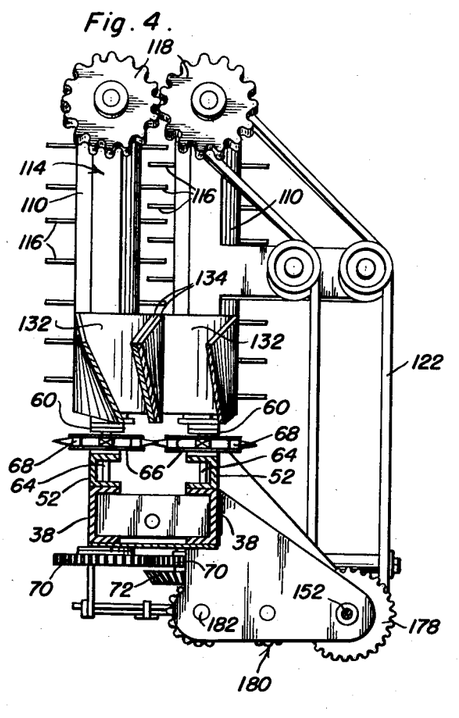
Figure 4 is a vertical sectional view taken substantially along the line 4—4 of Figure 1 showing one of the harvesters in detail.
Figure 18:
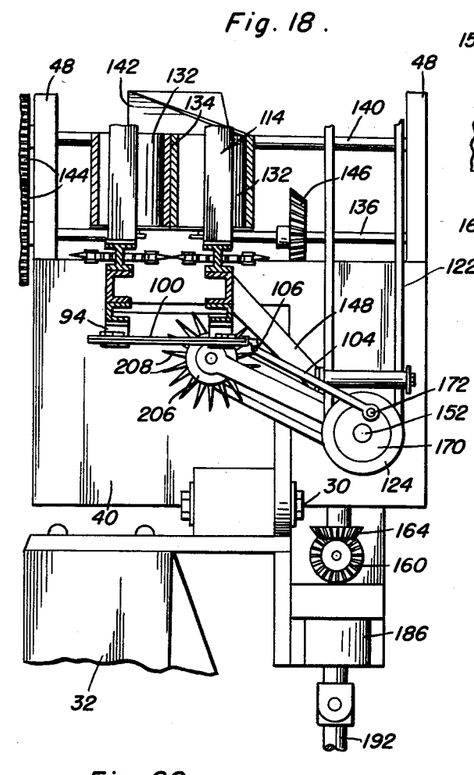
Figure 18 is an enlarged transverse sectional view taken substantially along the line 18—18 of Figure 2.

Mounted for rotation in suitable brackets 148 to one side of each frame 16, and extending through an opening 150 in the end cross member 40 of each frame 36 is a longitudinally extending drive shaft 152 to the rear end of which is connected a bevelled drive pinion 154. This drive pinion has meshing engagement with a bevel drive gear 156 mounted on a vertically extending shaft 158 which is journalled in a suitable bearing bracket 160 carried by the cross member 40 at the rear end of the frame 36. A bevel drive pinion 162 is fixed to the upper end of the shaft 158 and meshes with the bevel drive gear 146 so that when the shaft 158 is rotated, the belt 134 will be driven in unison with the drive shaft 152. The lower end of the vertical drive shaft 158 has fixed thereto a bevel drive pinion 164 which has meshing engagement with a bevel drive pinion 166 mounted on the end of a drive shaft 168 which extends horizontally and to the rear of the bracket arms 42 previously referred to. The drive pulley 124 (Fig. 18) is fixed to the forward end of the shaft 152 and the hub 170 of the drive pinion carries an eccentric pin 172 to which the end of the connecting rod 104 remote from the rock arm 90 is coupled so that as the drive pulley 124 is rotated, the sickle bars 80 and 100 will be moved in unison across their respective blades 96 and 98. Coupled to the shaft 152 slightly to the rear of the drive pulley 124 is a drive pulley 176, and keyed or otherwise fixed to the shaft 152 for rotation therewith adjacent the rear ends of the guide bars 54 is a drive gear 178 (Fig. 4) which has driving connection through a gear train designated generally 180 with a drive shaft 182 which is mounted on the frame to rotate about an axis in spaced parallel relation to the shaft 152. This drive shaft 182 is equipped adjacent one end with a bevel drive pinion 184 (Fig. 2) which has meshing engagement with the bevel drive gear 72 (Fig. 5) so that when the shaft 52 is rotated, the drive shafts 64 of the sprockets 66 will be rotated to drive the chains 68 in unison.

Figure 2:
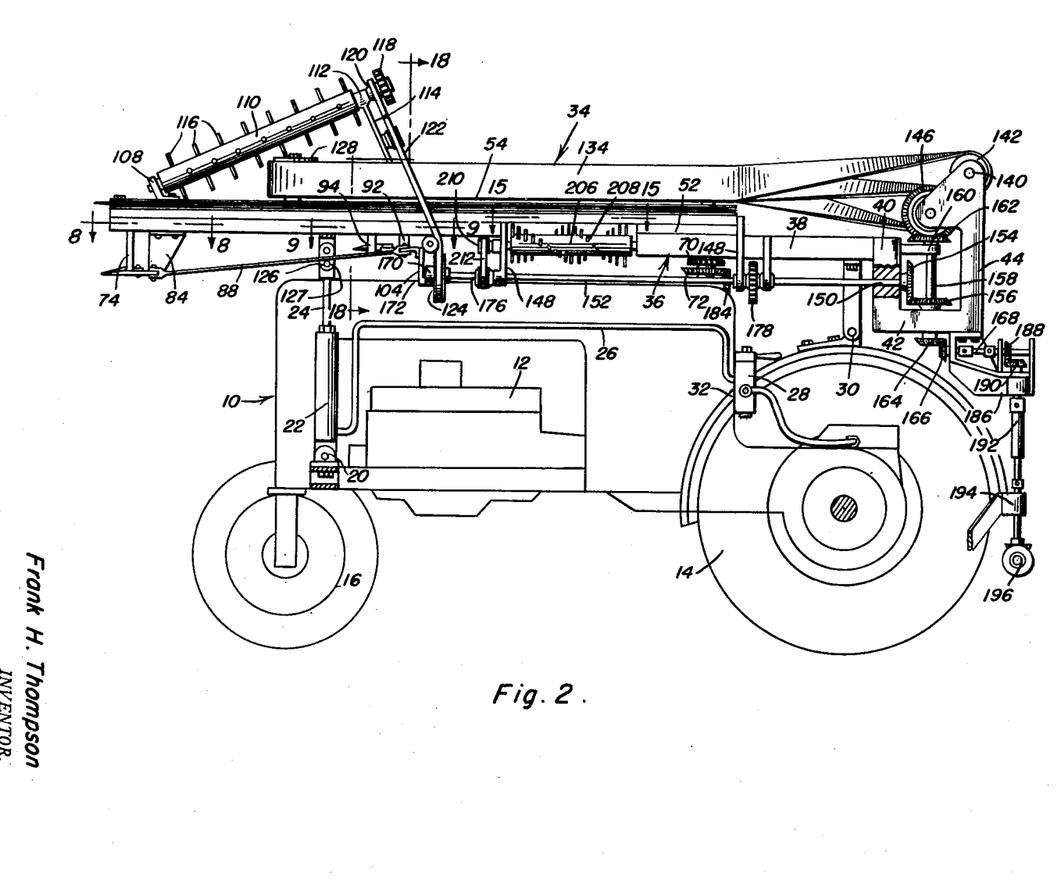
Figure 2 is a sectional view taken substantially along the line 2—2 of Figure 1, the tractor being shown in phantom.
Figure 3:
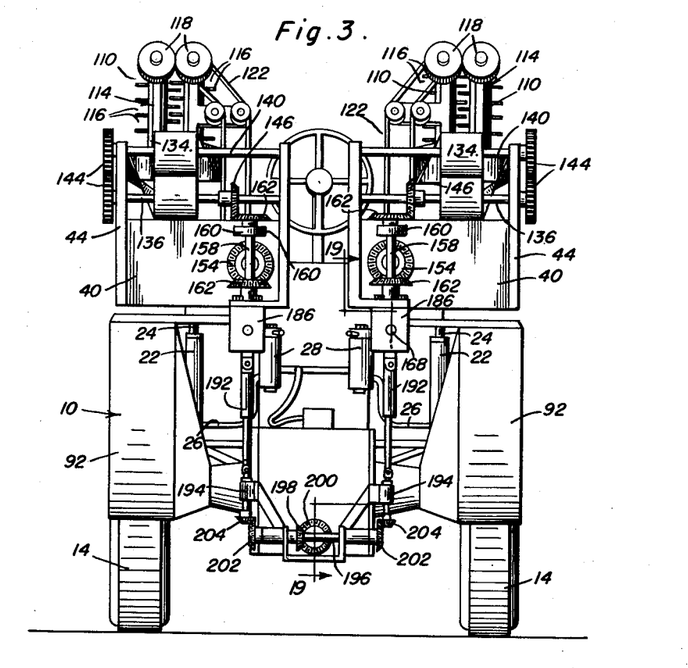
Figure 3 is a rear end elevation of the tractor illustrated in Figure 1.
Figure 19:
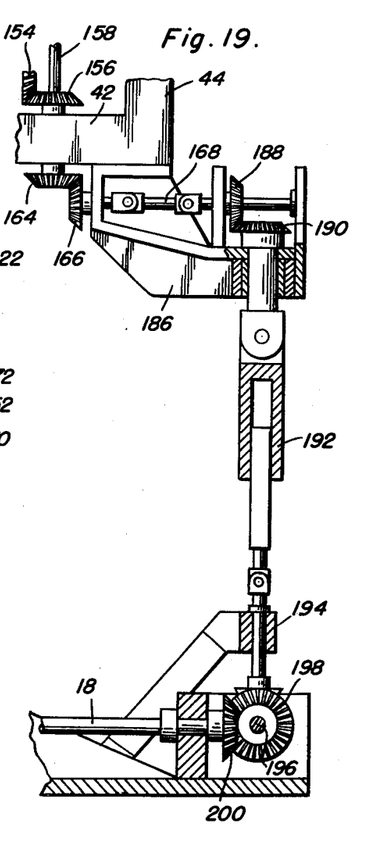
Figure 19 is an enlarged fragmentary sectional view through one of the telescopic shafts and the gearing associated therewith.
Figure 20:
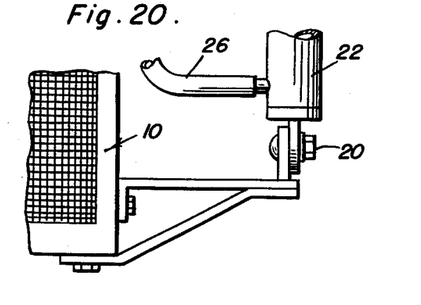
Figure 20 is a fragmentary enlarged view of the front end of the tractor on which the harvesters are mounted.

The shaft 168 is mounted in a suitable bracket 186 (Fig. 2). Carried by one of the arms 42 of the plate 40 is the shaft 168 to which is coupled for rotation therewith a bevel pinion 188. This pinion has meshing engagement with a bevel pinion 190 (Fig. 19) mounted on the upper end of a telescopic drive shaft 192, which is journalled in the bracket 186. The lower end of this telescopic shaft 192 is journalled in a suitable bracket 194 carried by the rear end of the tractor 10 adjacent one side thereof. A transverse shaft 196 extends across the rear end of the tractor and is journalled adjacent each end in a bracket 194. This main drive shaft 196 carries intermediate its ends a bevel pinion 198 which has meshing engagement with a bevel pinion 200 carried at the rear end of the power take-off shaft 18 previously described. Opposite ends of the main drive shaft 196 have connected thereto for rotation therewith bevel drive pinions 202 which have meshing engagement with bevel drive pinions 204 carried by the lower ends of the telescopic shafts 192 so that when the shaft 196 is rotated, the shafts 192 will likewise be driven.

Mounted in each frame to the rear of the sickle bar 100 (Fig. 2) and to one side of the longitudinal axis of its respective frame but in parallel relation therewith is a longitudinally extending cylinder 206 carrying spiral rows of radial fingers 208 which are adapted to engage the bottom ends of the broomcorn heads as they move rearwardly between the adjacent runs of the belts 134 to strip the boots therefrom. A suitable drive pulley 210 is coupled to the cylinder 206 for rotation therewith and has driving connection with the drive pulley 176 through the medium of an endless drive belt 212.

In use the two harvester units such as have just been described are mounted on a tractor on opposite sides of the longitudinal axis thereof and illustrated in the drawings so that they may rock about the axis of the pivots 30 under the influence of hydraulic fluid admitted to the cylinders 22 through the valves 28 in order that the forward ends of the harvesters may be adjusted to the height at which the broomcorn is to be cut. Advancing along between two rows of standing broomcorn, the tractor moves the harvesters in substantial alignment with the rows of broomcorn so that the standing stalks will be gathered by the fingers or spurs on the chains 68 and directed against the knives 76 so that the heads of the broomcorn will be severed by the sickle 80 from the stalks. The heads passing rearwardly between the chains 68 will encounter the fingers 116 of the elevating drums 110 which will strip the seeds from the heads and cause the heads to be bodily lifted into a position to be gripped by the adjacent runs of the belts 134. Moving rearwardly of the machine between the adjacent runs of the belts 134 the lower ends of the cut heads will encounter the knives 96 and sickle 100 which cut the bottoms from the heads. Moving further rearwardly between the adjacent runs of the belts 134 the broomcorn tops encounter the radial fingers 208 on the drums 206 so that the boots, leaves, and like undesirable matter will be stripped from the lower ends of the broomcorn heads. Owing to the fact that the adjacent runs of the belts 134 extend vertically for the major portion thereof, it will be obvious that the broomcorn heads will be advanced toward the rear of the tractor in a standing row until they pass beyond the rear idler pulleys 132. As the broomcorn heads pass to the rear of the rear idler pulleys 132, the adjacent runs of the belt are tilted toward the horizontal so as to tip the broomcorn heads outwardly away from the tractor for reception in any suitable trailing vehicle or other receptacle carried by the tractor. Owing to the fact that the adjacent runs of the belt 134 pass around the drive pulley 138 in a horizontal position, it will be evident that the space between adjacent runs of the belt increases as the rear end of the harvester is approached and consequently the gripping effect of the belt on the cut broomcorn heads is released automatically. Obviously by regulating the speed at which the tractor moves between the rows of standing broomcorn to the speed at which the cutting and tipping of the heads takes place, maximum efficiency of the harvester may be attained. Likewise by adjusting the height of the forward end of each harvester to suit the general height of the particular row of broomcorn being harvested it is obvious that the projection of the machine may be maintained in spite of widely varying differences in the heights of the rows of the standing crop.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. A broomcorn harvester which includes a pair of elongated spaced parallel side bars mounted on a farm tractor to rock in unison about a transverse horizontal axis near the rear end of the tractor, said bars extending longitudinally in substantially parallel relation to the tractor with their forward ends projecting beyond the forward end of the tractor, an endless conveyor chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor to drive the sickle and the chains in unison as the tractor advances along a standing crop of broomcorn, means carried by the tractor and connected to the bars to rock the bars about the horizontal axis and raise or lower the sickle, a rotary elevating cylinder mounted on each bar immediately behind the sickle, radial fingers on each cylinder cooperating to elevate the brush cut by the sickle and means driven by the power take-off of the tractor for rotating said cylinders and elevating the brush.

2. A broomcorn harvester which includes a paid of spaced parallel side bars mounted on a farm tractor to rock in unison about a horizontal axis near the rear end of the tractor, said bars extending longitudinally of the tractor with their forward ends projecting beyond the forward end of the tractor, an endless conveyer chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor to drive the sickle and the chains as the tractor advances along a standing crop of broomcorn, means carried by the tractor and connected to the bars to rock the bars about the horizontal axis and raise or lower the sickle, a rotary elevating cylinder mounted on each bar to the rear of the sickle, radial fingers on each cylinder cooperating to elevate the brush cut by the sickle and means driven by the power take-off of the tractor and connected to said cylinders for rotating said cylinders and elevating the brush, and a second sickle carried by the bars adjacent the rear ends of the elevating cylinders and means connected to the first mentioned sickle and to the last mentioned to drive said last mentioned sickle and cut the bottom ends off of the elevated brush.

3. A broomcorn harvester which includes a pair of spaced parallel side bars mounted on a farm tractor to rock in unison about a horizonal axis near the rear end of the tractor, said bars extending longitudinally of the tractor with their forward ends projecting beyond the forward end of the tractor, an endless conveyor chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor and to the sickle and the chains to drive said sickle and chains as the tractor advances along a standing crop of broomcorn, means carried by the tractor and connected to the bars to rock the bars about the horizontal axis and raise or lower the sickle, a rotary elevating cylinder mounted on each bar to the rear of the sickle, radial fingers on each cylinder cooperating to elevate the brush cut by the sickle and means driven by the power take-off of the tractor for rotating said cylinders and elevating the brush, and means operating in a closed path above the bars to grip the cut brush and deliver it to the rear end of the tractor.

4. A broomcorn harvester which includes a pair of spaced parallel side bars mounted on a farm tractor to rock in unison about a horizontal axis near the read end of the tractor, said bars extending longitudinally of the tractor with their forward ends projecting beyond the forward end of the tractor, an endless conveyor chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor and to the sickle and the chains to drive the sickle and the chains as the tractor advances along a standing crop of broomcorn, means carried by the tractor and connected to the bars to rock the bars about the horizontal axis to raise or lower the sickle, a rotary elevating cylinder mounted on each bar to the rear of the sickle, radial fingers on each cylinder cooperating to elevate the brush cut by the sickle and means driven by the power take-off of the tractor and connected to the cylinders for rotating said cylinders and elevating the brush, a pair of endless belts extending from between the cylinder and chains and moving rearward in adjacent planes for gripping the cut brush and delivering it to the rear end of the tractor and means for moving said belts in unison.

5. A broomcorn harvester which includes a pair of spaced parallel side bars mounted on a farm tractor to rock in unison about a horizontal axis near the rear end of the tractor, said bars extending longitudinally of the tractor with their forward ends projecting beyond the forward end of the tractor, an endless conveyor chain mounted on each bar for movement in a horizontal path, horizontally projecting fingers on the chains which cooperate in advancing cut broomcorn toward the rear of the harvester, a sickle carried by the bars below and adjacent their forward ends, means coupled to the power take-off of the tractor and to the sickle and the chains to drive the sickle and the chains as the tractor advances along a standing crop of broomcorn, means carried by the tractor and connected to the bars to rock the bars about the horizontal axis and raise or lower the sickle, a rotary elevating cylinder mounted on each bar to the rear of the sickle, radial fingers on each cylinder cooperating to elevate the brush cut by the sickle, means driven by the power take-off of the tractor and to the cylinders for rotating said cylinders and elevating the brush, means operating in closed horizontal paths above the chains and extending from a point about midway between the forward and rear ends of the cylinders to a point beyond the rear ends of the side bars to grip the brush and deliver it to the rear end of the tractor.

6. A broomcorn harvester which includes a pair of spaced parallel side bars mounted on a farm tractor to rock in unison about a horizontal axis near the rear end of the tractor, said bars extending longitudinally of the tractor with their forward ends projecting beyond the forward end of the tractor, an endless conveyor chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor and to the sickle and chains to drive the sickle and the chains as the tractor advances along a standing crop of broomcorn and means carried by the tractor and connected to the bars to rock the bars about the horizontal axis and raise or lower the sickle, a rotary elevating cylinder mounted on each bar to the rear of the sickle, radial fingers on each cylinder cooperating to elevate the brush cut by the sickle, means driven by the power take-off of the tractor and connected to the cylinders for rotating said cylinders and elevating the brush, a pair of endless belts extending from between the cylinders and chains and moving rearward in adjacent planes toward the rear end of the tractor in unison with the conveyor chains to grip the cut brush and deliver it to the rear of the tractor.

7. A broomcorn harvester which includes a pair of spaced parallel side bars mounted on a farm tractor to rock in unison about a horizontal axis near the rear end of the tractor, said bars extending longitudinally of the tractor with their forward ends projecting beyond the forward end of the tractor, an endless conveyor chain mounted on each bar for movement in a horizontal closed path, horizontally projecting fingers on the chains which cooperate in advancing cut broomcorn toward the rear of the harvester, a sickle carried by the bars below and adjacent their forward ends, means coupled to the power take-off of the tractor and to the sickle and chains to drive the sickle and the chains as the tractor advances along a standing crop of broomcorn, means carried by the tractor and connected to the bars to rock the bars about the horizontal axis to raise or lower the sickle, a rotary elevating cylinder mounted on each bar to the rear of the sickle, radial fingers on each cylinder cooperating to elevate the brush cut by the sickle, means driven by the power take-off of the tractor and connected by the cylinders for rotating said cylinders and elevating the brush, a pair of endless belts moving in adjacent planes toward the rear end of the tractor in unison with the conveyor chains to grip the cut brush and deliver it to the rear end of the tractor, idler pulleys holding the major portions of the adjacent runs of the belts vertically in juxtaposition and drive pulleys tilting the remainder of the juxtaposed portions of the adjacent runs of the belts into a horizontal position.

8. In a broomcorn harvester, a wheeled support, a pair of harvesting units pivoted about a transverse axis on opposite sides of the support, said units each including a pair of elongated, longitudinally extending, spaced arms for receiving a row of standing broomcorn therebetween as the support advances, means carried by the arms for engaging broomcorn below the tops thereof and carrying the same rearwardly between the arms, means carried by the arms for cutting the stalks of the broomcorn below the first means while engaged thereby, means for progressively thrashing the broomcorn tops upwardly from the first means and also for straightening the broomcorn tops while the same is engaged and being carried by the first means, further means for engaging the tops between the two first mentioned means prior to the completion of the thrashing thereof and also for maintaining the tops in straightened condition while carrying the same rearward with respect to the arms, means for rotating the tops to a horizontal position about a longitudinal axis while the same are being carried rearward by said further means to deposit the same in straightened condition in a horizontal attitude transverse to the direction of advance of the vehicle, means for selectively and independently raising and lowering the units about the transverse axis to vary the height at which the rows of broomcorn are cut.

9. In a broomcorn harvester, a wheeled support, a pair of harvesting units pivoted about a transverse axis on opposite sides of the support, said units each including a pair of elongated, longitudinally extending, spaced arms for receiving a row of standing broomcorn therebetween as the support advances, means carried by the arms for engaging broomcorn below the tops thereof and carrying the same rearwardly between the arms, means carried by the arms for cutting the stalks of the broomcorn below the first means while engaged thereby, means for progressively thrashing the broomcorn tops upwardly from the first means and also for straightening the broomcorn tops while the same is engaged and being carried by the first means, further means for engaging the tops between the two first mentioned means prior to the completion of the thrashing thereof and also for maintaining the tops in straightened condition while carrying the same rearward with respect to the arms, means for severing the tops below the point of engagement with the further means while so engaged, means for rotating the tops to a horizontal position about a longitudinal axis while the same are being carried rearward by said further means to deposit the same in straightened condition in a horizontal attitude transverse to the direction of advance of the vehicle, means for selectively and independently raising and lowering the units about the transverse axis to vary the height at which the rows of broomcorn are cut.

10. In a broomcorn harvester, a wheeled support, a pair of harvesting units pivoted about a transverse axis on opposite sides of the support, said units each including a pair of elongated, longitudinally extending, spaced arms for receiving a row of standing broomcorn therebetween as the support advances, means carried by the arms for engaging broomcorn below the tops thereof and carrying the same rearwardly between the arms, means carried by the arms for cutting the stalks of the broomcorn below the first means while engaged thereby, means for progressively thrashing the broomcorn tops upwardly from the first means and also for straightening the broomcorn tops while the same is engaged and being carried by the first means, further means for enaging the tops between the two first mentioned means prior to the completion of the thrashing thereof and also for maintaining the tops in straightening condition while carrying the same rearward with respect to the arms, means for rotating the tops to a horizontal position about a longitudinal axis while the same are being carried rearward by said further means to deposit the same in straightened condition in a horizontal attitude transverse to the direction of advance of the vehicle, means for stripping the boots from the tops while they are being carried by said further means, means for selectively and independently raising and lowering the units about the transverse axis to vary the height at which the rows of broomcorn are cut.

11. In a broomcorn harvester, a wheeled support, a pair of elongated, longitudinally extending, spaced arms carried by the support for receiving a row of standing broomcorn therebetween as the support advances, means carried by the arms for engaging broomcorn below the tops thereof and carrying the same rearwardly between the arms, means carried by the arms for cutting the stalks of the broomcorn below the first means while engaged thereby, means for progressively thrashing the tops upwardly from the first means and also for straightening the broomcorn tops while the same is engaged and being carried by the first means, further means for engaging the tops between the two first mentioned means prior to the completion of the thrashing and also for maintaining the tops in straightened condition while carrying the same rearward with respect to the arms, means for rotating the tops to a horizontal position about a longitudinal axis while the same are being carried rearward by said further means to deposit the same in straightened condition in a horizontal attitude transverse to the direction of advance of the vehicle.

12. A broomcorn harvester which includes means for gathering and cutting the tops from a row of standing stalks, means mounted above the cutting means for holding said tops and moving them away from the cutting means in a rectilinear substantially horizontal path, means mounted below the top moving means for severing the bottoms from said upright tops, means mounted below the top moving means for stripping the boots from said upright tops after the bottoms have been severed therefrom and means adjacent the stripping means and engaging the top moving means to tilt said top moving means about the path as an axis to deliver the tops in a substantially horizontal position.

FRANK H. THOMPSON.

REFERENCES CITED

The following references are of record in the file of this patent:

UNITED STATES PATENTS

| Number | Name | Date |
|---|---|---|
| 646,612 | Vaughn | Apr. 3, 1900 |
| 833,064 | Larson | Oct. 9, 1906 |
| 1,031,274 | Kinder | July 2, 1912 |
| 1,036,030 | Titus | Aug. 20, 1912 |
| 1,077,863 | Thomas | Nov. 4, 1913 |
| 1,365,213 | Woodland | Jan. 11, 1921 |
| 1,615,981 | James | Feb. 1, 1927 |
| 1,648,749 | Udstad et al. | Nov. 8, 1927 |
| 1,781,961 | Smith | Nov. 18, 1930 |
| 1,823,387 | Campbell | Sept. 15, 1931 |
| 1,938,264 | Templeton | Dec. 5, 1933 |
| 1,999,638 | Richards | Apr. 30, 1935 |
| 2,297,295 | Flintjer | Sept. 29, 1942 |
| 2,346,963 | Hague | Apr. 18, 1944 |